United States Patent
Eronen et al.

(10) Patent No.: US 12,471,873 B2
(45) Date of Patent: Nov. 18, 2025

(54) CONTROLLER, A DENTAL IMAGING SYSTEM, AND A METHOD FOR DENTAL IMAGING OF AN OBJECT

(71) Applicant: PALODEX GROUP OY, Tuusula (FI)

(72) Inventors: Esa Eronen, Littoinen (FI); Markus Rintamäki, Tuusula (FI); Paul Daquisto, Whitehouse Station, NJ (US)

(73) Assignee: PALODEX GROUP OY, Tuusula (FI)

( * ) Notice: Subject to any disclaimer, the term of this patent is extended or adjusted under 35 U.S.C. 154(b) by 256 days.

(21) Appl. No.: 18/251,149

(22) PCT Filed: Oct. 20, 2021

(86) PCT No.: PCT/FI2021/050701
§ 371 (c)(1),
(2) Date: Apr. 28, 2023

(87) PCT Pub. No.: WO2022/090612
PCT Pub. Date: May 5, 2022

(65) Prior Publication Data
US 2024/0366172 A1    Nov. 7, 2024

(30) Foreign Application Priority Data
Oct. 28, 2020   (FI) ..................................... 20206070

(51) Int. Cl.
*A61B 6/00* (2024.01)
*A61B 6/51* (2024.01)
(Continued)

(52) U.S. Cl.
CPC .............. *A61B 6/54* (2013.01); *A61B 6/4417* (2013.01); *A61B 6/4435* (2013.01); *A61B 6/51* (2024.01);
(Continued)

(58) Field of Classification Search
CPC ....... A61B 6/54; A61B 6/4417; A61B 6/4435; A61B 6/51; A61B 6/5264; A61B 5/0037;
(Continued)

(56) References Cited

U.S. PATENT DOCUMENTS

2006/0274881 A1  12/2006  Singh et al.
2009/0052617 A1*  2/2009  Sadakane ............... A61B 6/466
                                              378/38
(Continued)

FOREIGN PATENT DOCUMENTS

JP  2013-524948 A  6/2013
JP  2019-166306 A  10/2019
(Continued)

OTHER PUBLICATIONS

Nkenke, E. et al. "Fusion of computed tomography data and optical 3D images of the dentition for streak artefact correction in the simulation of orthognathic surgery." Dentomaxillofacial Radiology 33.4 (2004): 226-232.
(Continued)

*Primary Examiner* — Kiho Kim
(74) *Attorney, Agent, or Firm* — Michael Best & Friedrich LLP

(57) ABSTRACT

The invention relates to a controller (106) for dental imaging of an object. The controller comprises: at least one processor (802), and at least one memory (808) including computer program code (814). The at least one memory (808) and the computer program code (814) is configured to, with the at least one processor (802), cause the controller (106) at least to: obtain first image data from an optical scanner unit (104); obtain second image data from a dental X-ray imaging unit (102); produce a first surface model (202) from the obtained first image data, wherein the first surface model (202) represents an optical three-dimensional shape of a surface of
(Continued)

a first part of the object; and use the first surface model (202) to process the obtained second image data. The invention relates also to an imaging system (100), a method, a computer program (814), and a computer-readable medium for dental imaging of an object.

12 Claims, 5 Drawing Sheets

(51) Int. Cl.
*A61C 9/00* (2006.01)
*A61C 13/34* (2006.01)
*G06T 7/246* (2017.01)
*G06T 11/00* (2006.01)

(52) U.S. Cl.
CPC .......... *A61B 6/5264* (2013.01); *A61C 9/0053* (2013.01); *A61C 13/34* (2013.01); *G06T 7/251* (2017.01); *G06T 11/008* (2013.01); *G06T 2207/10116* (2013.01); *G06T 2207/30036* (2013.01); *G06T 2210/41* (2013.01)

(58) Field of Classification Search
CPC ... A61B 5/0088; A61B 6/5258; A61B 6/5247; A61B 5/0064; A61B 6/48; A61B 5/0062; A61B 5/107; A61B 6/00; A61B 6/02; A61C 9/0053; A61C 13/34; G06T 7/251; G06T 11/008; G06T 2207/10116; G06T 2207/30036; G06T 2210/41
See application file for complete search history.

(56) References Cited

U.S. PATENT DOCUMENTS

| | | |
|---|---|---|
| 2009/0310741 A1 | 12/2009 | Borghese et al. |
| 2009/0316966 A1 | 12/2009 | Marshall et al. |
| 2009/0325127 A1 | 12/2009 | Kusch et al. |
| 2010/0124367 A1 | 5/2010 | Cizek |
| 2011/0268327 A1 | 11/2011 | Getto et al. |
| 2015/0254816 A1 | 9/2015 | Carlson et al. |
| 2015/0359504 A1* | 12/2015 | Zhou .................... A61B 6/5217 378/38 |
| 2016/0042509 A1 | 2/2016 | Andreiko et al. |
| 2017/0218040 A1 | 8/2017 | Camarero Palao et al. |
| 2017/0265744 A1 | 9/2017 | Nyholm et al. |
| 2018/0168781 A1 | 6/2018 | Kopelman et al. |
| 2018/0242939 A1 | 8/2018 | Kang et al. |
| 2018/0360411 A1 | 12/2018 | Abkai |

FOREIGN PATENT DOCUMENTS

| | | |
|---|---|---|
| WO | 2014116868 A1 | 7/2014 |
| WO | 2017218040 A1 | 12/2017 |
| WO | 2020141366 A1 | 7/2020 |

OTHER PUBLICATIONS

International Search Report and Written Opinion for Application No. PCT/FI2021/050701 dated Jan. 25, 2022 (11 bages).
Finnish Patent and Registration Office Search Report for application 20206070, dated May 5, 2021 (3 pages).
Japanese Patent Office. Notice of Refusal for Application No. 2023-523189, dated Jun. 11, 2025, 6 pages with machine translation.

* cited by examiner

CONTROLLER, A DENTAL IMAGING SYSTEM, AND A METHOD FOR DENTAL IMAGING OF AN OBJECT

TECHNICAL FIELD

The invention concerns in general the technical field of dental imaging.

BACKGROUND

Typically, the correct positioning of a patient may be one of the most time-consuming tasks of a user of an X-ray imaging unit in an X-ray imaging process. Traditionally, the patient may be positioned to the X-ray imaging unit using various supporting methods that are supposed to hold a head of the patient as stationary as possible.

Traditional supporting means may be a chin rest, a static bite stick, and a head support, where the forehead, temple, and/or back of the skull is supported. In addition, different kind of straps may be used to make the patient positioning as rigid as possible. In addition, some X-ray imaging units have such bite sticks that are attached to the X-ray imaging unit such that attachment means allow movements of the bite sticks in some directions.

One approach that can be considered as traditional as well is using scout images. This is a small dose panoramic image or a set of two projection images taken at 90 degrees angle that can be used as a targeting aid for a three-dimensional (3D) image.

A rigid setup is very important with this kind of approach. When the patient positioning (targeting) is done, the patient should keep steady for a whole imaging process. If the patient and/or the X-ray imaging unit moves, i.e. the position of the patient with relation to the X-ray imaging unit changes, between the targeting and the X-ray scanning phases, the resulting X-ray image might be diagnostically useless. Motion of the patient and/or the X-ray imaging unit during the scanning phase may cause severe artifacts in the resulting X-ray image and these artifacts caused by the motion needs to be reduced during a reconstruction of obtained image data during the scanning phase to the dental X-ray image, if possible or can be tried to be reduced by using a software, i.e. computer program, -based correction. The artifacts caused by the motion may affect the dental X-ray image quality significantly. The result may be e.g. a blurred image or a distorted image.

Moreover, in panoramic imaging the anatomic shapes of the patient's jaws are unknown prior taking a panoramic image. Panoramic image quality is affected heavily based on how well a pre-defined imaging layer corresponds with the actual anatomic shapes, e.g. dental arch, of the patient. Typically, an average shape is used for all patients, which may lead to a non-optimized image quality.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a controller, an imaging system, a method, a computer program, and a tangible non-volatile computer-readable medium for dental imaging of an object, and a method for using optical image data in dental X-ray imaging of an object. Another objective of the invention is that the controller, the imaging system, the method, the computer program, and the tangible non-volatile computer-readable medium for dental imaging of an object, and the method for using optical image data in dental X-ray imaging of an object improve quality of the dental X-ray images.

The objectives of the invention are reached by a controller, an imaging system, methods, a computer program, and a tangible non-volatile computer-readable medium as defined by the respective independent claims.

According to a first aspect, a controller for dental imaging of an object is provided, wherein the controller comprises: at least one processor, and at least one memory including computer program code, wherein the at least one memory and the computer program code is configured to, with the at least one processor, cause the controller at least to: obtain first image data from an optical scanner unit; obtain second image data from a dental X-ray imaging unit; produce a first surface model from the obtained first image data, wherein the first surface model represents an optical three-dimensional shape of a surface of a first part of the object; and use the first surface model to process the obtained second image data.

The optical scanner unit may be an intra oral scanner unit.

The obtained first image data may comprise first image data previously obtained from the optical scanner unit.

The controller may be configured to: detect based on the first surface model a motion of the object occurring during an acquisition of the second image data, and reduce based on the first surface model artifacts caused by the motion in a two-dimensional or a three-dimensional dental X-ray image reconstructed from the obtained second image data.

The detection of the motion may comprise: production of a second surface model from the obtained second image data, wherein the second surface model represents an X-ray 3D shape of a surface of a second part of the object, and wherein the second part of the object overlaps at least partly with the first part of the object; comparison of a similarity of the second surface model and the first surface model; and detection of the motion, if the second surface model differs from the first surface model.

The production of the second surface model may comprise: reconstruction of the obtained second image data to a three-dimensional dental X-ray image, and extraction of the second surface model from the three-dimensional dental X-ray image by using segmentation.

Alternatively or in addition, the detection of the motion may further comprise registration of the first surface model and the second surface model before the comparison.

Alternatively, the controller may be configured to: determine based on the first surface model an anatomic shape of the object, and adjust a reconstruction of a dental X-ray image from the obtained second image data so that a focal trough in the dental X-ray image corresponds to the anatomic shape of the object determined based on the first surface model.

According to a second aspect, an imaging system for dental imaging of an object is provided, wherein the imaging system comprises: a dental X-ray imaging unit for providing second image data, wherein the dental X-ray imaging unit comprises: a gantry part, an X-ray source part for emitting X-rays, and an X-ray imaging detector part for receiving the X-rays from the source part, wherein the gantry part comprises the source part and the detector part; an optical scanner unit for providing first image data; and a controller as described above, wherein the controller is configured to: obtain the first image data from the optical scanner unit; obtain the second image data from the dental X-ray imaging unit; produce a first surface model from the obtained first image data, wherein the first surface model represents an optical three-dimensional shape of a surface of a first part of the object; and use the first surface model to process the obtained second image data.

According to a third aspect, a method for dental imaging of an object is provided, which method is performed by a controller as defined above, wherein the method comprises: obtaining first image data from an optical scanner unit; obtaining second image data from a dental X-ray imaging unit; producing a first surface model from the obtained first image data, wherein the first surface model represents an optical three-dimensional shape of a surface of a first part of the object; and using the first surface model to process the obtained second image data.

According to a fourth aspect, a computer program is provided, wherein the computer program comprises instructions which, when the program is executed by a controller as described above, cause the controller to carry out the method as described above.

According to a fifth aspect, a tangible non-volatile computer-readable medium is provided, wherein the tangible non-volatile computer-readable medium comprises instructions which, when executed by a controller as described above, cause the controller to carry out the method as described above.

According to a sixth aspect, a method for using optical image data in dental X-ray imaging of an object is provided, wherein the method comprises: obtaining optical image data of the object from an optical scanner unit, and using the obtained optical image data in the dental X-ray imaging of the object.

The using of the obtained optical image data may comprise: detecting based on the optical image data a motion of the object occurring during an acquisition of X-ray image data of the object, and reducing based on the optical image data artifacts caused by the motion in a two-dimensional or a three-dimensional dental X-ray image reconstructed from the X-ray image data of the object.

Alternatively, the using of the obtained optical image data may comprise adjusting a reconstruction of a dental X-ray image from X-ray image data of the object so that a focal trough in the dental X-ray image corresponds to an anatomic shape of the object determined based the optical image data.

Alternatively, the using of the obtained optical image data may comprise defining based on the optical image data an imaging geometry of a dental X-ray imaging unit for an acquisition of the X-ray image data of the object.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

In this description we use the following vocabulary concerning different phases of a dental X-ray imaging process. The term radiating means the phase comprising merely the irradiation, i.e. the phase when an X-ray source is providing an X-ray beam that travels through an object to an X-ray imaging detector. The object may be expected to remain as still, i.e. immobile, as possible during the radiating. During the radiating one or more parts of the dental X-ray imaging unit may move. The term scanning, in turn, means the phase comprising the radiating and moving of one or more parts of the dental X-ray imaging unit. The scanning does not comprise positioning of one or more parts of the X-ray imaging unit in a correct place for providing X-ray images. The term imaging means the whole process comprising radiating, scanning and positioning.

Figure 1:
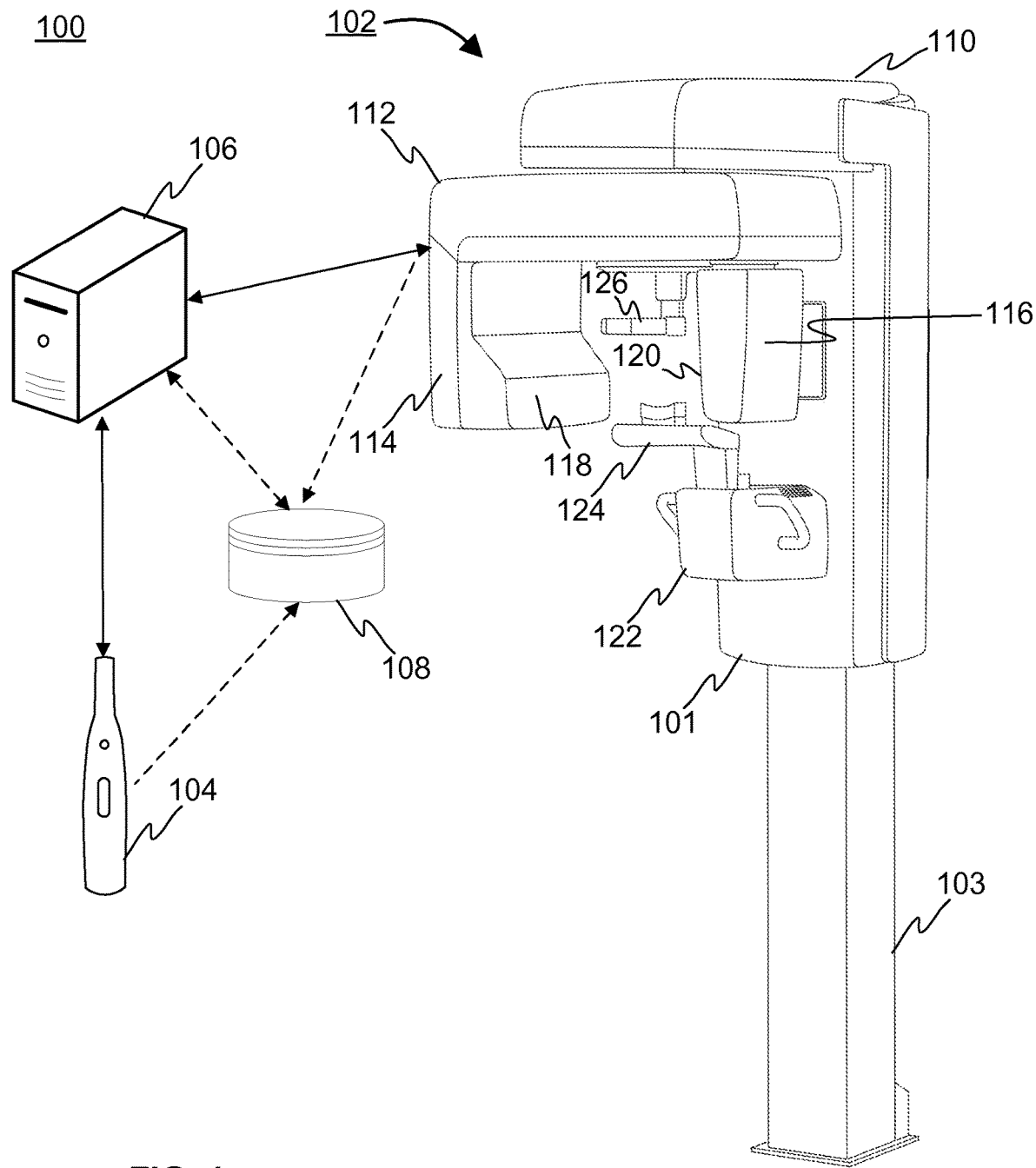
FIG. 1 illustrates schematically an example of an imaging system according to the invention.

FIG. 1 illustrates an example of an imaging system 100 according to the invention. The imaging system 100 comprises a dental X-ray imaging unit 102 for providing dental X-ray image data, i.e. second image data, of the object, an optical scanner unit 104 for providing optical image data, i.e. first image data, of the object, and a controller 106.

The dental X-ray imaging unit 102 may be configured for, for example imaging of the dentomaxillofacial complex of the human skull. The dental X-ray imaging unit 102 may be configured to provide different types of imaging procedures, including, but not limited to computed tomography (CT) imaging, panoramic imaging (standard, pediatric, orthozone, wide arch, orthogonal and/or the like), and/or cephalomatric imaging (cephalo pediatric lateral projection, cephalo lateral projection, cephalo posterior-anterior, and/or the like). The CT imaging may be Cone beam CT (CBCT) imaging, wherein the beam is a cone-shaped beam, or alternative CT imaging, wherein the beam is a pyramidal-shaped beam, half-moon-shaped cone beam, or any other shaped beam. FIG. 1 illustrates only one example of a dental X-ray imaging unit 102 for use with the concepts in the present disclosure.

The dental X-ray imaging unit 102 comprises a housing 101 that is moveably supported on a support column 103. The housing 101 may be moved up and down in the vertical direction by means of a guide motor (not shown in FIG. 1) that is configured to move the housing 101 vertically up and down along the supporting column 103. A supporting section, i.e. upper shelf, 110 is configured to support a gantry part, i.e. a rotating part, 112, which is rotatable in a horizontal plane with respect to the supporting section 110. The supporting section 110 and/or gantry part 112 may comprise a rotating motor (not shown in FIG. 1) configured to rotate the gantry part 112. Alternatively or in addition, the supporting section 110 may comprise a pivot motor (not shown in FIG. 1) configured to pivot the gantry part 112 around the column 103. Alternatively or in addition, the dental X-ray imaging unit 102 may be mounted to a supporting structure (not shown in FIG. 1) exemplarily a wall to being supported by the column 103.

The dental X-ray imaging unit 102 comprises further an X-ray source housing 114 and an X-ray imaging detector housing 116, which are arranged opposite to each other and extending generally vertically from the gantry part 112. The source housing 114 comprises an X-ray source 118. The X-ray source 118 is positioned to emit X-rays from the X-ray source 118 through the object being imaged, e.g. a head of the patient, to an X-ray imaging detector 120 locating in the X-ray imaging detector housing 116.

Furthermore, the dental X-ray imaging unit 102 may comprise a lower shelf 122 that extends from the housing 101. The lower shelf 122 may comprise a chin support 124 for positioning the object, e.g. a head of the patient (not shown in FIG. 1), between the opposed X-ray source 118 and the X-ray imaging detector 120 as in the example dental X-ray imaging unit 102 of FIG. 1. Alternatively or in addition, the dental X-ray imaging unit 102 may comprise a head support 126 extending from the horizontal supporting section 110 through the rotating part 112 as in the example dental X-ray imaging unit 102 of FIG. 1. Alternatively, the lower shelf 122 may comprise the head support 126. The patient support parts, i.e. chin support 124 and the head support 126, may be optional, and positioning of the patient may be carried out in other manners.

The X-ray source 118 is configured to project a beam (not depicted in FIG. 1) of X-rays towards the X-ray imaging detector 120. The X-ray source 118 may comprise a collimator (not shown in FIG. 1) to restrict and/or shape the beam of X-rays. The X-rays pass through a portion of the object, for example the patient's anatomy, e.g. patient's head. The anatomical structures through which the X-rays pass may absorb varying amounts of the X-ray energy. After passing through the object, the attenuated X-rays are received by the X-ray imaging detector 120. The X-ray imaging detector 120 is configured to convert the magnitude of the received X-ray energy and to produce a digitized output, i.e. X-ray image data, representative of the unabsorbed X-rays at the X-ray imaging detector 120. The collection of digitized outputs from the X-ray imaging detector 120 that correspond to a single emission of a beam of X-rays from the X-ray source 118 may be referred to a projection image of the object being imaged, for example the head of the patient.

The gantry part 112 may be rotated by a rotating motor, for example. The rotation of the gantry part 112 rotates the X-ray source 118 and the X-ray imaging detector 120 around the object to be imaged, for example around a rotation axis. The rotation axis may be a mechanical rotation axis or a virtual rotation axis. The mechanical rotation axis of the gantry part 112, may be oriented, i.e. aligned, with the center of the object to be imaged or with a particular anatomical feature of interest within the object to be imaged, for example patient's head. The virtual rotation axis may be obtained, for example, by moving the mechanical rotation axis along a circular path, whereupon the virtual rotation axis may be formed in the center of said circular path. Non-circular rotation may be produced, for example, by moving the X-ray source 108 and the X-ray imaging detector 120 along a path deviating from the circular path, for example an elliptic path. Other techniques or alignments for the rotation axis may also be used as will be recognized by a person or ordinary skill in the art. As the X-ray source 118 and X-ray imaging detector 120 are rotated around the object, for example the head of the patient, the X-ray imaging device 102 operates to acquire a plurality of projection images of the object taken at incremental angles of rotation. As a non-limiting example, the projection images may be acquired about a 180° or 360° rotation, e.g. in the CT imaging. According to another non-limiting example, the projection images may be acquired about a 220° rotation, e.g. in the panoramic imaging. Furthermore, the X-ray imaging unit 102 may capture, for example between 250-1600 projection images in an imaging operation. However, this is not intended to be limiting on the present disclosure. Such increments may represent fractions of a degree of rotation. Other angular increments and other total angles of rotation are contemplated within the scope of the present disclosure. The dental X-ray image may be formed from the plurality of projection images by reconstructing the X-ray image data to the dental X-ray image.

The optical scanner unit 104 may be an intra oral scanner (IOS) unit as illustrate in the example of FIG. 1. Intraoral scanners are devices for capturing direct optical impressions in dentistry. With the IOS unit 104 optical image data of the object may be provided directly inside a mouth of the patient or from a stone model or a dental impression produced from the object. Alternatively, the optical scanner unit 104 may be a desktop optical scanner unit. With the desktop optical scanner unit 104 optical image data of the object may be provided from the stone model or the dental impression produced from the object. FIG. 1 illustrates only one example of an optical scanner unit 104 for use with the concepts in the present disclosure.

The controller 106 is configured to obtain first image data of the object, e.g. the patient's anatomy, e.g. a dental arch of the patient, from the optical scanner unit 104. The first image data may be for example optical image data provided, i.e. acquired, by the optical scanner unit 104 as described above. Moreover, the controller 106 is configured to obtain second image data of the same object at least partly from the dental X-ray imaging unit 102. The second image data may be e.g. X-ray image data provided, i.e. acquired, by the dental X-ray imaging unit 102 as described above. A field of view (FOV) of the optical scanner unit 104, when providing the first image data of the object and a 3D FOV of the dental X-ray imaging unit 102, when providing the second image data of the same object, may overlap at least partly. The controller 106 may obtain the first image data directly from the optical scanner unit 104 or from a database 108 to which the first image data previously obtained from the optical scanner unit 104 may be stored to, i.e. the obtained first image data comprises first image data previously obtained from the optical scanner unit 104. For example, the previously obtained first image data may be obtained few minutes or even several years earlier before the image processing with the controller 106 and stored to the database 108. Alternatively or in addition, the controller 106 may obtain the second image data directly from the dental X-ray imaging unit 102 or from a database 108 to which the second image data previously obtained from the dental X-ray imaging unit 102 may be stored to. For example, the previously obtained second image data may be obtained few minutes or even several years earlier before the image processing with the controller 106 and stored to the database 108. The previously obtained first image data and the previously obtained second image data may be stored to separate databases or to the same database 108 as illustrated in the example of FIG. 1.

According to an example of the invention, in response to obtaining the second image data from the dental X-ray imaging unit 102 the controller 106 may be configured to check whether a previously obtained first image data of the same object has been stored to the database 108. If the controller 106 detects that a previously obtained first image data of the same object has been stored to the database 108, the controller 106 is configured to obtain the first image data from the database 108.

Figure 2:
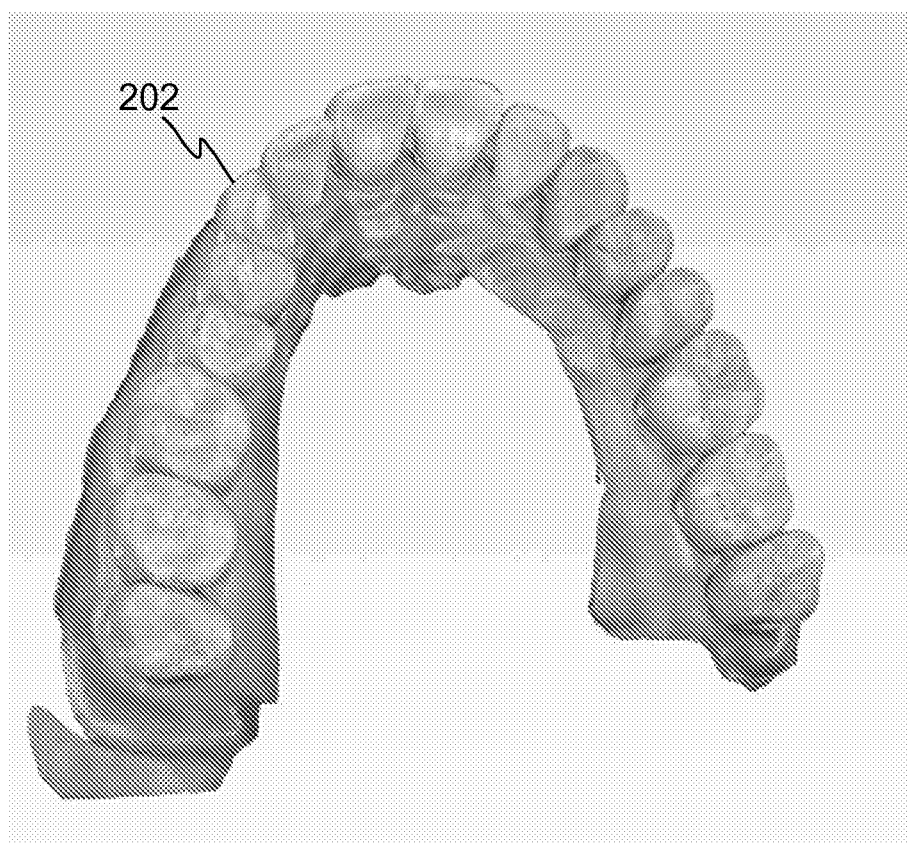
FIG. 2 illustrates an example of a first surface model produced from optical image data.

The controller 106 may further be configured to produce a first surface model 202 from the obtained first image data. The first surface model represents an optical three-dimensional (3D) shape of a surface of a first part of the object. FIG. 2 illustrates a non-limiting example of the first surface model 202 produced from the first image data. The controller 106 may further be configured to use the first surface model 202 to process the obtained second image data. The use of the first surface model 202, by the controller 106, to process the obtained second image data may depend on the type of the imaging procedure, e.g. CT imaging or panoramic imaging, i.e. panoramic modality.

Next an example of the use of the first surface model 202, by the controller 106, to process the obtained second image data is discussed, wherein the imaging procedure used by the dental X-ray imaging unit 102 may be e.g. CT imaging, e.g. CBCT imaging. The controller 106 may be configured to detect a motion of the object occurring during an acquisition of the second image data, i.e. during the scanning process in which the second image data is provided, and to reduce artifacts caused by the motion in a two-dimensional (2D) or a three-dimensional (3D) dental X-ray image reconstructed from the obtained second image data based on the first surface model 202. The 2D or 3D dental X-ray image may be e.g. a CT image.

Figure 3:
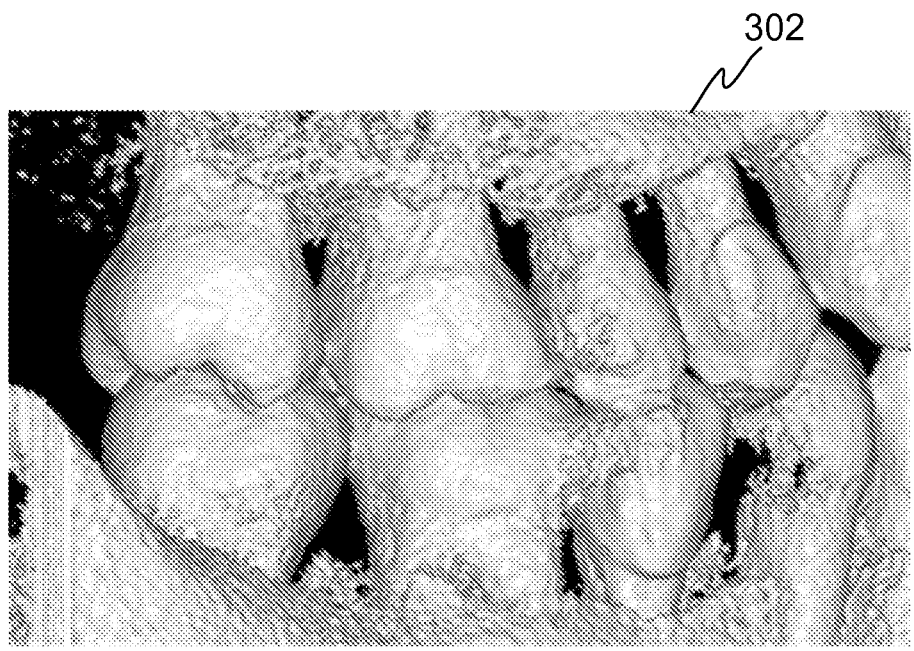
FIG. 3 illustrates an example of a second surface model produced from dental X-ray image data.

The controller 106 may be configured to produce a second surface model 302 from the obtained second image data. The second surface model 302 represents an X-ray 3D shape of a surface of a second part of the object. FIG. 3 illustrates a non-limiting example of the second surface model 302 produced from the second image data. The second part of the object overlaps at least partly with the first part of the object so that the first surface model 202 and the second surface model 302 are at least partly from the same part of the same object. For example, the first part of the object from which the first surface model 202 is provided may comprise upper and/or lower full dental arch of the patient, a part of the upper and/or lower dental arch of the patient, or a single tooth of the patient. Alternatively or in addition, the second part of the object from which the second surface model 302 is provided may comprise upper and/or lower full dental arch of the patient, a part of the upper and/or lower dental arch of the patient, or a single tooth of the patient as long as the second part of the object overlaps at least partly with the first part of the object. The production of the second surface model 302 may comprise reconstruction of the obtained second image data to a 3D dental X-ray image, and extraction of the second surface model 302 from the 3D dental X-ray image by using segmentation.

In order to detect the motion of the object occurring during the acquisition of the second image data, the controller 106 may be configured to compare a similarity of the second surface model 302 and the first surface model 202 and to detect motion, if the second surface model 302 differs from the first surface model 202. According to an example, before the comparison of the similarity of the surface models 202, 203, the controller 106 may be configured to register, i.e. align, the first surface model 202 and the second surface model 302. The registration may comprise determination of at least one reference structure from the second surface model 302, finding the corresponding at least one reference structure from the first surface model 202, and registration of the first surface model 202 and the second surface model 302 based on the at least one reference structure. Alternatively, the registration may comprise determination of at least one reference structure from the first surface model 202, finding the corresponding at least one reference structure from the second surface model 302, and registration of the first surface model 202 and the second surface model 302 based on the at least one reference structure. For example, the at least one reference structure may be, but is not limited to, a specific tooth.

As discussed above, the dental X-ray image may be formed from the plurality of projection images. Each projection image has an accurately defined and known imaging geometry. If the object does not stay immobile or the dental X-ray imaging unit 102 movements do not follow the defined imaging geometry, the reconstruction result, i.e. the reconstructed dental X-ray image, will be distorted by the artifacts caused by the motion. If the controller 106 detects that the second surface model 302 differs from the first surface model 202, the controller 106 detects motion, i.e. infers that the object has been moved during the acquisition of the second image data. In response to detection of the motion, the controller 106 may further be configured to reduce the artifacts caused by the motion in the dental X-ray image reconstructed from the obtained second image data. Alternatively, if the controller 106 detects that there is no substantial difference between the second surface model 302 and the first surface model 202, the controller 106 detects no motion, i.e. infers that the object has not moved during the acquisition of the second image data, causing that there is no need for performing any corrections, e.g. reduction of the artifacts, of the X-ray image.

According to an example, the reduction of the artifacts caused by the motion may comprise iterative adaptation of a mutual imaging geometry of the plurality of projection images forming the dental X-ray image reconstructed from the obtained second image data in order to provide minimum difference between the first surface model 202 and the second surface model 202, i.e. to find the best match between the first surface model and the second surface model causing that the second surface model 302 becomes as similar as possible as the first surface model 202.

Next another example of the use of the first surface model 202, by the controller 106, to process the obtained second image data is discussed, wherein the imaging procedure used by the dental X-ray imaging unit 102 may be e.g. panoramic imaging. The controller 106 may be configured to determine an anatomic shape of the object, e.g. dental arch or jawbone shape of the patient, based on the first surface model 202 and to adjust the reconstruction of the dental X-ray image from the obtained second image data so that a focal trough in the dental X-ray image corresponds to the anatomic shape of the object determined based on the first surface model 202. The dental X-ray image may be a 2D dental X-ray image, e.g. 2D panoramic image or a bitewing image. The parts of the patient's anatomy that hit in a sharp layer are sharp in the dental X-ray image and the other parts of the patient's anatomy are blurred.

According to an example embodiment of the invention, wherein the imaging procedure used by the dental X-ray imaging unit 102 may be e.g. panoramic imaging, the controller 106 may be configured to use the first image data, e.g. the optical image data, obtained from the optical scanner 104 in the acquisition of the second image data with the dental X-ray imaging unit 102. The use of the first image data in this example embodiment may comprise that the controller 106 may be configured to use the first image data to define an imaging geometry of the X-ray imaging unit 102 for the acquisition of the second image data, i.e. for the scanning process in which the second image data may be provided. The controller 106 may be configured to obtain the first image data of the object, e.g. the patient's anatomy, from the optical scanner unit 104 as discussed above. As also discussed above the controller 106 may obtain the first image data directly from the optical scanner unit 104 or from a database 108 to which the first image data previously obtained from the optical scanner unit 104 may be stored to, i.e. the obtained first image data comprises first image data previously obtained from the optical scanner unit 104.

The controller 106 may further be configured to produce the first surface model 202 from the obtained first image data. The first surface model 202 represents an optical 3D shape of a surface of a first part of the object as discussed above. The first part of the object from which the first surface model 202 may be provided may comprise upper and/or lower full dental arch of the patient. The controller 106 may further be configured to determine the anatomic shape of the object, e.g. dental arch or jawbone shape of the patient, based on the first surface model 202 as discussed above.

As discussed above, the controller 106 may be configured to define the imaging geometry of the dental X-ray imaging unit 102 for the acquisition of the second image data based on the first surface model 202. The imaging geometry of the dental X-ray imaging unit 102 may be defined by the controller 106 based on the anatomic shape of the object determined based on the first surface model 202 so that the focal trough in the dental X-ray image reconstructed from the second image data acquired by using the defined imaging geometry corresponds to the anatomic shape of the object determined based on the first surface model 202. In other words, in this example embodiment the first surface model 202 is formed and the anatomic shape of the object is determined based on the first surface model 202 before the acquisition of the second image data by the dental X-ray imaging unit 102, i.e. before the scanning process in which the second image data is provided. The controller 106 may further be configured to use information representing positioning of the object to define the imaging geometry of the dental X-ray imaging unit 102 so that that the focal trough in the dental X-ray image reconstructed from the second image data acquired by using the defined imaging geometry of the X-ray imaging unit 102 corresponds to the anatomic shape of the object determined based on the first surface model 202. The information representing the positioning of the object may comprise for example a position from which the object is supported, e.g. by using one or more of the patient support parts, and/or the center of the object. The information representing the positioning of the object may be defined by using any known techniques. According to a non-limiting example, the position from which the object is supported may be defined based on a bite block, e.g. a bite stick, arranged for example to the chin support 124. The controller 106 may be configured to provide the defined imaging geometry of the dental X-ray imaging unit 102 to the dental X-ray imaging unit 102, which may then be configured to acquire, i.e. provide, the second image data of the same object by using the defined imaging geometry.

The controller 106 may further be configured to obtain from the dental X-ray imaging unit 102 the second image data acquired by using the defined imaging geometry of the dental X-ray unit 102 and to reconstruct the obtained second image data to a dental X-ray image, e.g. a 2D panoramic image or a bitewing image, wherein the focal trough in the dental X-ray image reconstructed from the obtained second image data corresponds to the anatomic shape of the object determined based on the first surface model 202.

Above the invention is described referring to the controller 106. The invention relates also to a method for dental imaging of the object. The first image data, e.g. the optical image data, may be used in the dental X-ray imaging of the object. The first image data may be used to process the obtained second image data, e.g. the X-ray image data. Alternatively, the first image data may be used in the acquisition of the second image data with the dental X-ray imaging unit 102. The use of the obtained first image data in the acquisition of the second image data, e.g. in the panoramic imaging, may comprise defining based on the first image data an imaging geometry of the dental X-ray imaging unit 102 for the acquisition of the second image data. The use of the first image data to process the obtained second image data, e.g. in the CT imaging, may comprise detecting based on the first image data a motion of the object occurring during an acquisition of the second image data, and reducing based on the first image data artifacts caused by the motion in a two-dimensional or a three-dimensional dental X-ray image reconstructed from the second image data. Alternatively, the use of the first image data to process the obtained second image data, e.g. in the panoramic imaging, may comprise adjusting a reconstruction of the dental X-ray image from the second image data so that a focal trough in the dental X-ray image corresponds to an anatomic shape of the object determined based the first image data.

Figure 4:
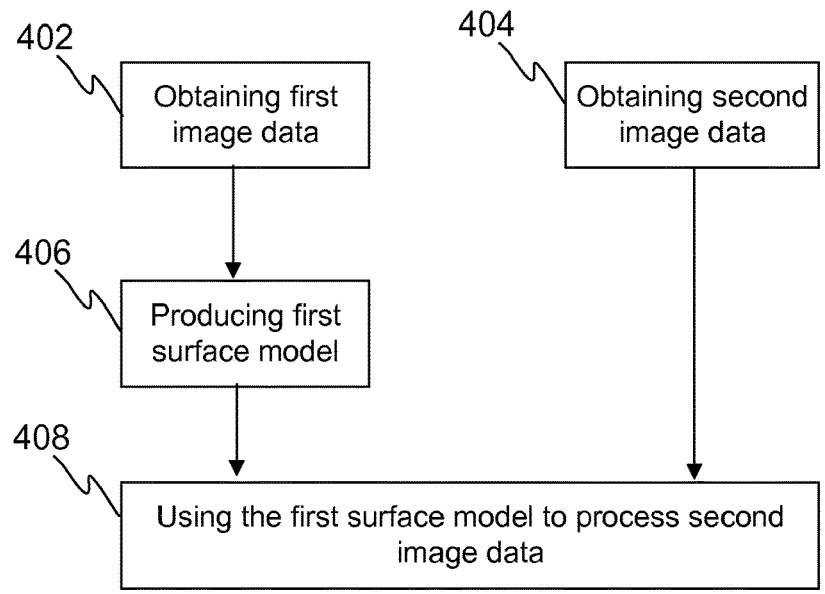
FIG. 4 illustrates schematically an example of a method according to the invention.

Next an example of the method according to the invention is described by referring to FIG. 4. FIG. 4 schematically illustrates the invention as a flow chart. It is to be recognized that embodiments of the method may be carried out without each of the steps as disclosed herein or in conjunction with additional steps.

At a step 402 the controller 106 obtains first image data of the object, e.g. the patient's anatomy, from an optical scanner unit 104. The first image data may be for example optical image data. As discussed above, the controller 106 may obtain the first image data directly from the optical scanner unit 104 or from a database 108 to which the first image data previously obtained from the optical scanner unit 104 may be stored to, i.e. the obtained first image data comprises first image data previously obtained from the optical scanner unit 104.

At a step 404 the controller 106 obtains second image data of the same object from e.g. a dental X-ray imaging unit 102. The second image data may be e.g. X-ray image data. According to an example, in response to obtaining the second image data from the dental X-ray imaging unit 102 the controller 106 checks whether previously obtained first image data of the same object has been stored to the database 108. If the controller 106 detects that previously obtained first image data of the same object has been stored to the database 108, the controller 106 is configured to obtain the first image data from the database 108 at the step 402.

At a step 406, the controller 106 produces a first surface model 202 from the obtained first image data. The first surface model 202 represents an optical 3D shape of a surface of a first part of the object as discussed above.

Figure 5:
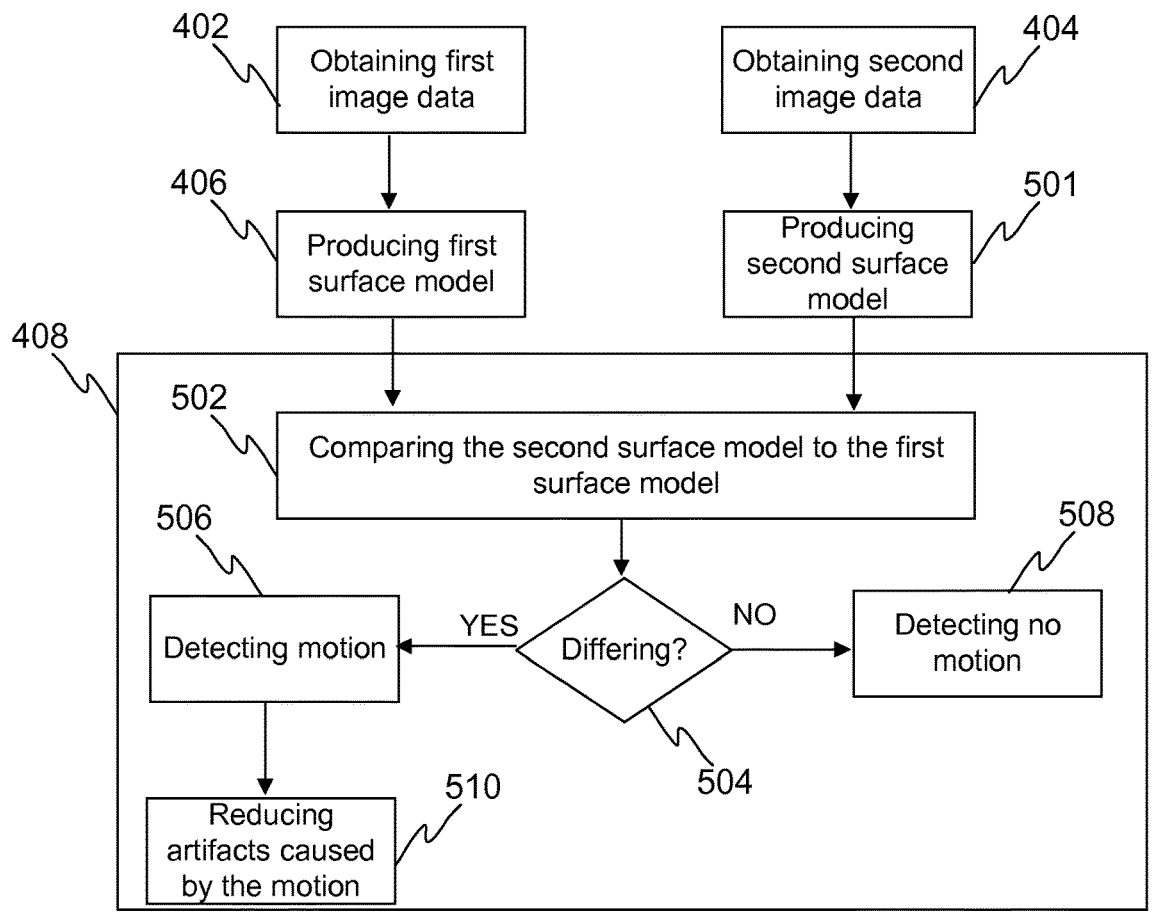
FIG. 5 illustrates schematically another example of a method according to the invention.
Figure 6:
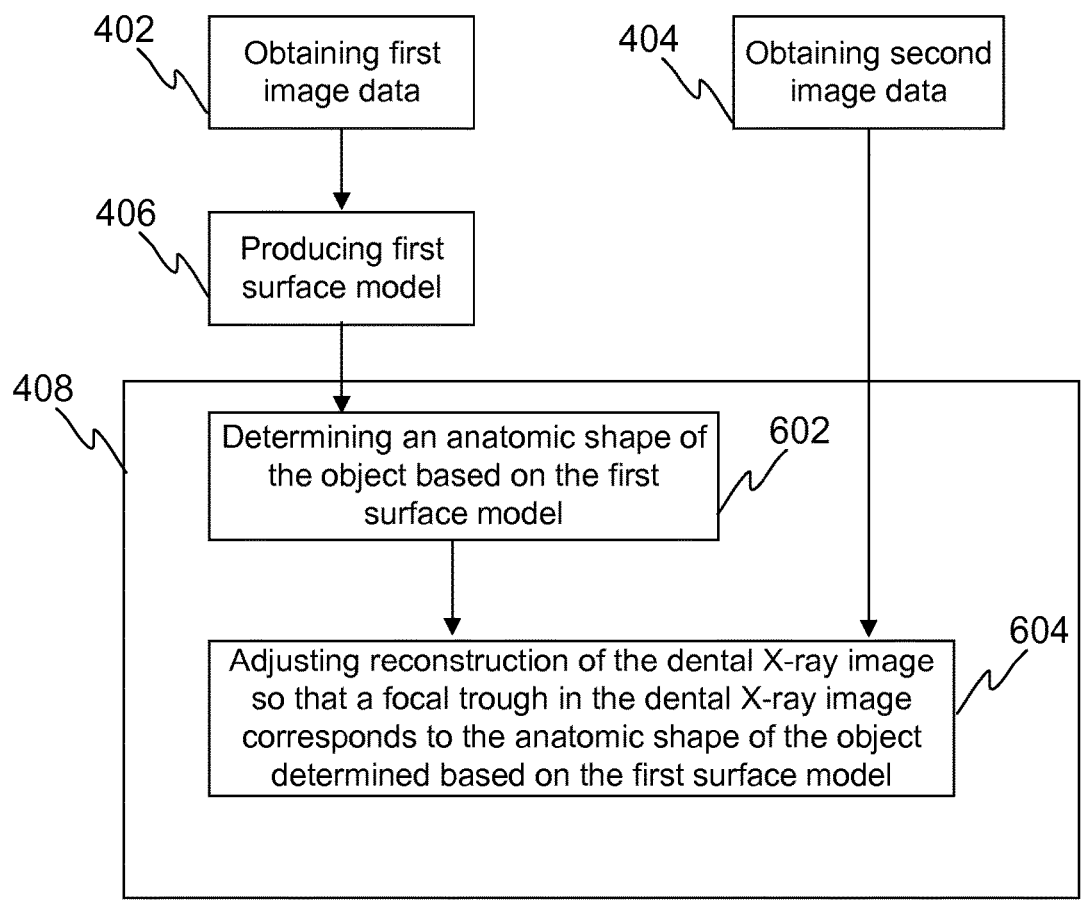
FIG. 6 illustrates schematically yet another example of a method according to the invention.

At a step 408, the controller 106 uses the first surface model 202 to process the obtained second image data. The use of the first surface model 202, by the controller 106, to process the obtained second image data at the step 408 may depend on the type of the imaging procedure, e.g. CT imaging or panoramic imaging, i.e. panoramic modality. The step 408 is discussed more in detail by referring to FIGS. 5 and 6. FIG. 5 illustrates an example embodiment of the method according the invention, wherein the imaging procedure used by the dental X-ray imaging unit 102 may be e.g. CT imaging, e.g. CBCT imaging. FIG. 6 illustrates another example embodiment of the method according the invention, wherein the imaging procedure used by the dental X-ray imaging unit 102 may be e.g. panoramic imaging. The steps 402 to 408 of the example methods of FIGS. 5 and 6 corresponds to the steps 402 to 408 of the example method of FIG. 4, but the step 408, i.e. the step of using the first surface model 202 to process the obtained second image data, is disclosed in more detail manner referring to FIGS. 5 and 6.

Next an example of the use of the first surface model 202, by the controller 106, to process the obtained second image data at the step 408 is discussed by referring to FIG. 5, wherein the imaging procedure used by the dental X-ray imaging unit 102 may be e.g. CT imaging, e.g. CBCT imaging.

At a step 501 the controller 106 produces a second surface model 302 from the obtained second image data. The second surface model 302 represents a 3D X-ray shape of a surface of a second part of the object. The second part of the object overlaps at least partly with the first part of the object so that the first surface model 202 and the second surface model 302 are at least partly from the same part of the object as discussed above.

At the step 408 of FIG. 5, the controller 106 may detect a motion of the object occurring during the acquisition of the second image data, i.e. the scanning process in which the second image data is provided, and reduce artifacts caused by the motion in a 2D or a 3D dental X-ray image reconstructed from the obtained second image data based on the first surface model. This will be discussed more in detail by referring to steps 502-510 of FIG. 5. The 2D or 3D dental X-ray image may be e.g. a CT image.

At a step 502 the controller 106 compares a similarity of the second surface model 302 and the first surface model 202 in order to detect whether the object has been moved during the acquisition of the second image data, i.e. during the scanning process or not. According to an example, before the comparison of the surface models, the controller 106 may register, i.e. align, the first surface model 202 and the second surface model 302. The registration may comprise determination of at least one reference structure from the second surface model 203, finding the corresponding at least one reference structure from the first surface model 202, and registration of the first surface model 202 and the second surface model 302 based on the at least one reference structure. Alternatively, the registration may comprise determination of at least one reference structure from the first surface model 202, finding the corresponding at least one reference structure from the second surface model 302, and registration of the first surface model 202 and the second surface model 302 based on the at least one reference structure. For example, the at least one reference structure may be, but is not limited to, a specific tooth.

If the controller 106 detects at a step 504 based on the comparison at the step 502 that the second surface model 302 differs from the first surface model 202, the controller 106 detects motion at a step 506, i.e. infers that the object has been moved the acquisition of the second image data. In response to the detection of the motion at the step 506, the controller reduces at a step 510 the artifacts caused by the motion in the dental X-ray image reconstructed from the obtained second image data caused by the motion. Alternatively, if the controller 106 detects at the step 504 based on the comparison at the step 502 that there is no substantial difference between the second surface model 302 and the first surface model 202, the controller 106 detects no motion at a step 508, i.e. infers that the object has not moved during the acquisition of the second image data causing that there is no need for performing any corrections, e.g. reduction of the artifacts, of the dental X-ray image.

According to an example, the reduction of the artifacts caused by the motion at the step 510 may comprise iterative adaptation of a mutual imaging geometry of the plurality of projection images forming the dental X-ray image reconstructed from the obtained second image data in order to provide minimum difference or maximum similarity between the first surface model 202 and the second surface model 302, i.e. to find the best match between the first surface model 202 and the second surface model 203 causing that the second surface model 302 becomes as similar as possible as the first surface model 202.

Next an example of the use of the first surface model 202, by the controller 106, to process the obtained second image data at the step 408 is discussed by referring to FIG. 6, wherein the imaging procedure used by the dental X-ray imaging unit 102 may be e.g. panoramic imaging.

At a step 602 the controller 106 determines an anatomic shape of the object, e.g. dental arch or jawbone shape of the patient, based on the first surface model 202.

At a step 604 the controller 106 may further adjust the reconstruction of the dental X-ray image from the obtained second image data so that a focal trough in the dental X-ray image corresponds to the anatomic shape of the object determined based on the first surface model 202. The parts of the patient's anatomy that hit in a sharp layer are sharp in the dental X-ray image and the other parts of the patient's anatomy are blurred. The dental X-ray image may be a 2D dental X-ray image, e.g. a 2D panoramic image.

Figure 7:
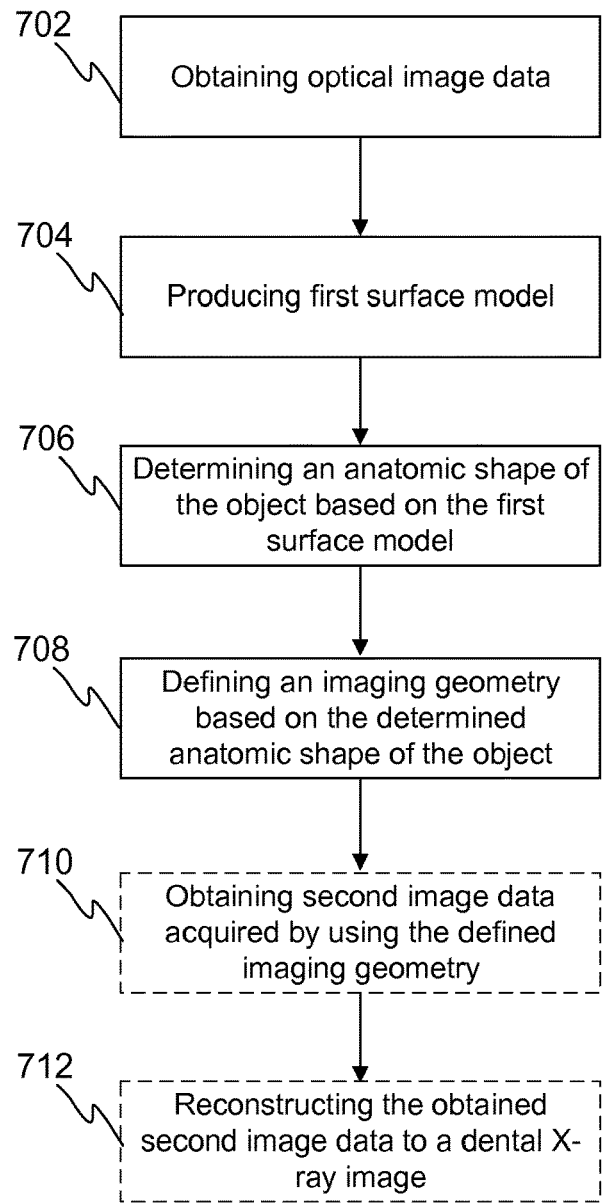
FIG. 7 illustrates schematically yet another example of a method according to the invention.

FIG. 7 illustrates schematically another example embodiment of a method according to the invention, wherein the controller 106 may use the first image data, e.g. optical image data, obtained from the optical scanner 104 in the acquisition of the second image data, i.e. in the scanning process in which the second image data may be provided, with the dental X-ray imaging unit 102. For example, in the example method of FIG. 7 the imaging procedure used by the dental X-ray imaging unit 102 may be panoramic imaging.

At a step 702 the controller 106 obtains first image data of the object, e.g. the patient's anatomy, from an optical scanner unit 104 as discussed above referring to the step 402. The first image data may be for example optical image data. As also discussed above, the controller 106 may obtain the first image data directly from the optical scanner unit 104 or from a database 108 to which the first image data previously obtained from the optical scanner unit 104 may be stored to, i.e. the obtained first image data comprises first image data previously obtained from the optical scanner unit 104.

At a step 704, the controller 106 produces a first surface model 202 from the obtained first image data. The first surface model 202 represents an optical 3D shape of a surface of a first part of the object as discussed above referring to the step 406. The first part of the object from which the first surface model 202 may be provided may comprise upper and/or lower full dental arch of the patient.

At a step 706 the controller 106 determines an anatomic shape of the object, e.g. dental arch or jawbone shape of the patient, based on the first surface model 202 as discussed above referring to the step 602.

At a step 708, the controller 106 uses the first image data in the acquisition of the second image data. The use of the first image data in the acquisition of the second image data may comprise that the controller 106 defines the imaging geometry of the X-ray imaging unit 102 for the acquisition of second image data based on the first surface model 202. The imaging geometry of the dental X-ray imaging unit 102 may be defined by the controller 106 based on the determined anatomic shape of the object determined based the first surface model 202 so that that the focal trough in a dental X-ray image reconstructed from the second image data acquired by using the defined imaging geometry of the X-ray imaging unit 102 corresponds to the anatomic shape of the object determined based on the first surface model 202. In other words, in this example embodiment the first surface model 202 is formed and the anatomic shape of the object is determined based on the first surface model 202 before the acquisition of the second image data by the dental X-ray imaging unit 102, i.e. before the scanning process in which the second image data is provided. The controller 106 may further use information representing positioning of the object to define the imaging geometry of the dental X-ray imaging unit 102 so that that the focal trough in the dental X-ray image reconstructed from the second image data acquired by using the defined imaging geometry of the X-ray imaging unit 102 corresponds to the anatomic shape of the object determined based on the first surface model 202. The information representing the positioning of the object may comprise for example a position from which the object is supported, e.g. by using one or more of the patient support parts, and/or the center of the object. The information representing the positioning of the object may be defined by using any known techniques. According to a non-limiting example, the position from which the object is supported may be defined based on a bite block, e.g. a bite stick, arranged for example to the chin support 124. The controller 106 may provide the defined imaging geometry of the dental X-ray imaging unit 102 to the dental X-ray imaging unit 102, which may then acquire, i.e. provide, the second image data of the same object by using the defined imaging geometry.

At a step 710 the controller 106 may further obtain from the dental X-ray imaging unit 102 the second image data acquired by using the defined imaging geometry of the dental X-ray unit 102.

At a step 712 the controller 106 may further reconstruct the obtained second image data to a dental X-ray image, e.g. a 2D panoramic image or a bitewing, wherein the focal trough in the dental X-ray image reconstructed from the obtained second image data corresponds to the anatomic shape of the object determined based on the first surface model 202.

Figure 8:
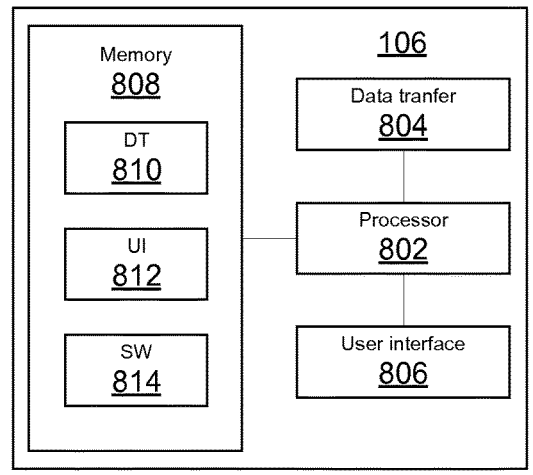
FIG. 8 illustrates schematically an example of a controller according to the invention.

FIG. 8 illustrates a schematic example of a controller 106 according to the invention. The controller 106 may comprise a processor part 802, a data transfer part 804, a user interface part 806, and a memory part 808. The processor part 802 is configured to perform user and/or computer program (software) initiated instructions, and to process data. The processor part 802 may comprise at least one processor. The memory part 808 is configured to store and maintain data. The data may be instructions, computer programs, and any data files. The memory part 808 may comprise at least one memory. The memory part 808 may further comprise at least a data transfer application 810 in order to control the data transfer part 804, a user interface application 812 in order to control the UI part 806, and a computer program (code) 814 in order to control the operations of the controller 106. The memory part 880 and the computer program 814, together with the processor part 802, may cause the controller 106 at least to implement one or more method steps and/or operations of the controller 106 as described above.

The data transfer part 804 may be configured to send control commands external units, e.g. the dental X-ray imaging unit 102. In addition, the data transfer part 804 may receive data from external units, e.g. the dental X-ray imaging unit 102, the optical scanner unit 104, the database and/or any other external units.

The user interface (UI) part 806 may be configured to input control commands, to receive information and/or instructions, and to display information. The UI part 806 may comprise at least a display, a screen, a touchscreen, at least one function key, a keyboard, a wired or wireless remote controller, or any other user input and/or output device.

The computer program 814 may be a computer program product that may be comprised in a tangible, non-volatile (non-transitory) computer-readable medium bearing the computer program code 814 embodied therein for use with a computer, i.e. the controller 106.

Some non-limiting examples of the controller 106 may e.g. be a server, cloud server, personal computer, laptop computer, computing circuit, or a network of computing devices. The location of the controller 106 is not limited and the controller 106 may be located anywhere. For example, the controller 106 may be implemented as part of the dental X-ray imaging unit 102. Alternatively, the controller 106 may be implemented as an external part, i.e. external unit, of the dental X-ray imaging 102.

At least some embodiments of the present invention described above enable a simple way to reduce artifacts caused by motion of the object from 2D or 3D dental X-ray images, e.g. 3D CBCT images, by using the optical image data. At least some embodiments of the present invention described above improve the quality of the dental X-ray images, e.g. 3D CBCT images and/or 2D panoramic images, by using the optical image data.

The specific examples provided in the description given above should not be construed as limiting the applicability and/or the interpretation of the appended claims. Lists and groups of examples provided in the description given above are not exhaustive unless otherwise explicitly stated.

The following numbered clauses describe some aspects of the invention.

Clause 1. A controller 106 for dental imaging of an object, the controller 106 comprising:
  at least one processor 802, and
  at least one memory 808 including computer program code 814, wherein the at least one memory 808 and the computer program code 814 is configured to, with the at least one processor 802, cause the controller 106 at least to:
obtain first image data from an optical scanner unit 104,
produce a first surface model 202 from the obtained first image data, wherein the first surface model 202 represents an optical three-dimensional shape of a surface of a first part of the object, and
use the first surface model 202 in an acquisition of second image data of the object.

Clause 2. The controller 106 according to clause 1, wherein the optical scanner unit 104 is an intra oral scanner unit.

Clause 3. The controller 106 according to any of the preceding clauses, wherein the obtained first image data comprises first image data previously obtained from the optical scanner unit 104.

Clause 4. The controller 106 according to any of the preceding clauses, wherein the controller 106 is configured to define based on the first surface model 202 an imaging geometry of a dental X-ray imaging unit 102 for the acquisition of the second image data of the object.

Clause 5. The controller 106 according to clause 4, wherein the controller 106 is further configured to:
obtain from the dental X-ray imaging unit 102 second image data of the object acquired by using the defined imaging geometry of the dental X-ray imaging unit 102, and
reconstruct the obtained second image data to a dental X-ray image.

Clause 6. An imaging system 100 for dental imaging of an object, the imaging system 100 comprising:
a dental X-ray imaging unit 102 for providing second image data, wherein the dental X-ray imaging unit 102 comprises:
a gantry part 112,
an X-ray source part 118 for emitting X-rays, and
an X-ray imaging detector part 120 for receiving the X-rays from the source part 118,
wherein the gantry part 112 comprises the source part 118 and the detector part 120,
an optical scanner unit 104 for providing first image data, and
a controller 106 according to any of the preceding clauses, wherein the controller 106 is configured to:
obtain first image data from the optical scanner unit 104,
produce a first surface model 202 from the obtained first image data, wherein the first surface model 202 represents an optical three-dimensional shape of a surface of a first part of the object, and
use the first surface model 202 in an acquisition of the second image data of the object.

Clause 7. A method for dental imaging of an object, which method is performed by a controller 106 according to any of clauses 1 to 5, wherein the method comprising:
obtaining first image data from an optical scanner unit 104,
producing a first surface model 202 from the obtained first image data, wherein the first surface model 202 represents an optical three-dimensional shape of a surface of a first part of the object, and
using the first surface model 202 in an acquisition of a second image data of the object.

Clause 8. A computer program 814 comprising instructions which, when the program is executed by a controller 106 according to any of clauses 1 to 5, cause the controller 106 to carry out the method according to clause 7.

Clause 9. A tangible non-volatile computer-readable medium comprising instructions which, when executed by a controller 106 according to any of clauses 1 to 5, cause the controller 106 to carry out the method according to clause 7.

The invention claimed is:

1. A controller for dental imaging of an object, the controller comprising:
at least one processor, and
at least one memory including computer program code,
wherein the at least one memory and the computer program code is configured to, with the at least one processor, cause the controller at least to:
obtain first image data from an optical scanner unit,
obtain second image data from a dental X-ray imaging unit,
produce a first surface model from the obtained first image data, wherein the first surface model represents an optical three-dimensional shape of a surface of a first part of the object,
use the first surface model to process the obtained second image data,
detect based on the first surface model a motion of the object occurring during an acquisition of the second image data, and
reduce based on the first surface model artifacts caused by the motion in a two-dimensional or a three-dimensional dental X-ray image reconstructed from the obtained second image data,
wherein the detection of the motion comprises:
production of a second surface model from the obtained second image data,
wherein the second surface model represents an X-ray 3D shape of a surface of a second part of the object, and wherein the second part of the object overlaps at least partly with the first part of the object;
comparison of a similarity of the second surface model and the first surface model; and
detection of the motion, if the second surface model differs from the first surface model.

2. The controller according to claim 1, wherein the optical scanner unit is an intra oral scanner unit.

3. The controller according to claim 1, wherein the obtained first image data comprises first image data previously obtained from the optical scanner unit.

4. The controller according to claim 1, wherein the production of the second surface model comprises:
reconstruction of the obtained second image data to a three-dimensional dental X-ray image, and
extraction of the second surface model from the three-dimensional dental X-ray image by using segmentation.

5. The controller according to claim 1, wherein the detection of the motion further comprises registration of the first surface model and the second surface model before the comparison.

6. A controller for dental imaging of an object, the controller comprising
at least one processor, and
at least one memory including computer program code,
wherein the at least one memory and the computer program code is configured to, with the at least one processor, cause the controller at least to:
obtain first image data from an optical scanner unit,
obtain second image data from a dental X-ray imaging unit, produce a first surface model from the obtained first image data, wherein the first surface model represents an optical three-dimensional shape of a surface of a first part of the object, use the first surface model to process the obtained second image data, determine based on the first surface model an anatomic shape of the object, and adjust a reconstruction of a dental X-ray image from the obtained second image data so that a focal trough in the dental X-ray image corresponds to the anatomic shape of the object determined based on the first surface model.

7. An imaging system for dental imaging of an object, the imaging system comprising:
a dental X-ray imaging unit for providing second image data, wherein the dental X-ray imaging unit comprises:
a gantry part,
an X-ray source part for emitting X-rays, and
an X-ray imaging detector part for receiving the X-rays from the source part,
wherein the gantry part comprises the source part and the detector part,
an optical scanner unit for providing first image data, and
a controller configured to:
obtain the first image data from the optical scanner unit,
obtain the second image data from the dental X-ray imaging unit,
produce a first surface model from the obtained first image data, wherein the first surface model represents an optical three-dimensional shape of a surface of a first part of the object, and
use the first surface model to process the obtained second image data,
detect based on the first surface model a motion of the object occurring during an acquisition of the second image data, and
reduce based on the first surface model artifacts caused by the motion in a two-dimensional or a three-dimensional dental X-ray image reconstructed from the obtained second image data,
wherein the detection of the motion comprises:
production of a second surface model from the obtained second image data,
wherein the second surface model represents an X-ray 3D shape of a surface of a second part of the object, and wherein the second part of the object overlaps at least partly with the first part of the object;
comparison of a similarity of the second surface model and the first surface model; and
detection of the motion, if the second surface model differs from the first surface model.

8. A method for dental imaging of an object, which method is performed by a controller comprising:
at least one processor, and
at least one memory including computer program code, wherein the method comprises, via the controller executing the computer program code:
obtaining first image data from an optical scanner unit,
obtaining second image data from a dental X-ray imaging unit,
producing a first surface model from the obtained first image data, wherein the first surface model represents an optical three-dimensional shape of a surface of a first part of the object,
using the first surface model to process the obtained second image data,
detecting based on the first surface model a motion of the object occurring during an acquisition of the second image data, and
reducing based on the first surface model artifacts caused by the motion in a two-dimensional or a three-dimensional dental X-ray image reconstructed from the obtained second image data,
wherein the detecting the motion comprises:
production of a second surface model from the obtained second image data,
wherein the second surface model represents an X-ray 3D shape of a surface of a second part of the object, and wherein the second part of the object overlaps at least partly with the first part of the object;
comparison of a similarity of the second surface model and the first surface model; and
detection of the motion, if the second surface model differs from the first surface model.

9. A tangible non-volatile computer-readable medium comprising instructions which, when executed by a controller cause the controller to
obtain first image data from an optical scanner unit,
obtain second image data from a dental X-ray imaging unit,
produce a first surface model from the obtained first image data, wherein the first surface model represents an optical three-dimensional shape of a surface of a first part of an object,
use the first surface model to process the obtained second image data,
detect based on the first surface model a motion of the object occurring during an acquisition of the second image data, and
reduce based on the first surface model artifacts caused by the motion in a two-dimensional or a three-dimensional dental X-ray image reconstructed from the obtained second image data,
wherein the detecting the motion comprises:
production of a second surface model from the obtained second image data,
wherein the second surface model represents an X-ray 3D shape of a surface of a second part of the object, and wherein the second part of the object overlaps at least partly with the first part of an object;
comparison of a similarity of the second surface model and the first surface model; and
detection of the motion, if the second surface model differs from the first surface model.

10. A method for using optical image data in dental X-ray imaging of an object, the method comprising:
obtaining optical image data of the object from an optical scanner unit,
using the obtained optical image data in the dental X-ray imaging of the object, and
using the obtained optical image data comprises adjusting a reconstruction of a dental X-ray image from X-ray image data of the object so that a focal trough in the dental X-ray image corresponds to an anatomic shape of the object determined based the optical image data.

11. The method according to claim 10, wherein the using of the obtained optical image data comprises:
detecting based on the optical image data a motion of the object occur-ring during an acquisition of X-ray image data of the object, and reducing optical image data artifacts caused by the motion in a two-dimensional or a three-dimensional dental X-ray image reconstructed from the X-ray image data of the object.

12. The method according to claim 10, wherein the using of the obtained optical image data comprises defining based on the optical image data an imaging geometry of a dental X-ray imaging unit for an acquisition of the X-ray image data of the object.

* * * * *